United States Patent [19]

Stork

[11] Patent Number: 5,806,036
[45] Date of Patent: Sep. 8, 1998

[54] SPEECHREADING USING FACIAL FEATURE PARAMETERS FROM A NON-DIRECT FRONTAL VIEW OF THE SPEAKER

[75] Inventor: David G. Stork, Stanford, Calif.

[73] Assignees: Ricoh Company, Ltd., Tokyo, Japan; Ricoh Corporation, Menlo Park, Calif.

[21] Appl. No.: 516,090

[22] Filed: Aug. 17, 1995

[51] Int. Cl.⁶ .............................. G10L 5/06; H04M 11/00
[52] U.S. Cl. ............................ 704/260; 704/271; 379/52
[58] Field of Search .................................... 395/2.69, 2.8; 379/52; 348/14; 704/260, 271

[56] References Cited

U.S. PATENT DOCUMENTS

| | | | |
|---|---|---|---|
| 5,175,793 | 12/1992 | Sakamoto et al. | 395/2.09 |
| 5,473,726 | 12/1995 | Marshall | 395/2.4 |
| 5,553,119 | 9/1996 | McAllister et al. | 379/67 |
| 5,586,215 | 12/1996 | Stork et al. | 395/2.41 |

OTHER PUBLICATIONS

N. Michael Brooke, "Using the Visual Component in Automatic Speech Recognition", Proc. Fourth International Conference on Spoken Language Processing (ICSLP 96), Oct. 1996.

Iain Matthews, J. Andrew Bangham, and Stephen Cox, "Audiovisual Speech Recognition Using Multiscale Nonlinear Image Decomposition", Proc. Fourth International Conference on Spoken Language Processing (ICSLP 96), Oct. 1996.

Juergen Luettin, Neil A. Thacker, and Steve. W. Beer, "Speechreading Using Shape and Intensity Information," Proc. Fourth International Conference on Spoken Language Processing (ICSLP 96), Oct. 1996.

David G. Stork, Greg Wolff, and Earl Levine, "Neural network lipreading system for improved speech recognition", Proceedings of the International Joint Conference on Neural Networks, IJCNN–92, vol. II, pp. 289–295, Jun. 1992.

Primary Examiner—David R. Hudspeth
Assistant Examiner—Tālivaldis Ivars Šmits
Attorney, Agent, or Firm—Blakely, Sokoloff, Taylor & Zafman

[57] ABSTRACT

A system for performing recognition having a telephone transmitter, a camera, a data channel and recognition processing logic, in which the camera is directly mounted to and positioned with respect to the telephone housing to obtain video information from a non-direct frontal view of the speaker corresponding to at least one facial feature for use in speechreading. The facial features that may be obtained include the position of the tongue, separation of the teeth and the rounding protrusion of the lips. Using this data, recognition processing logic performs speechreading recognition of the video information.

22 Claims, 2 Drawing Sheets

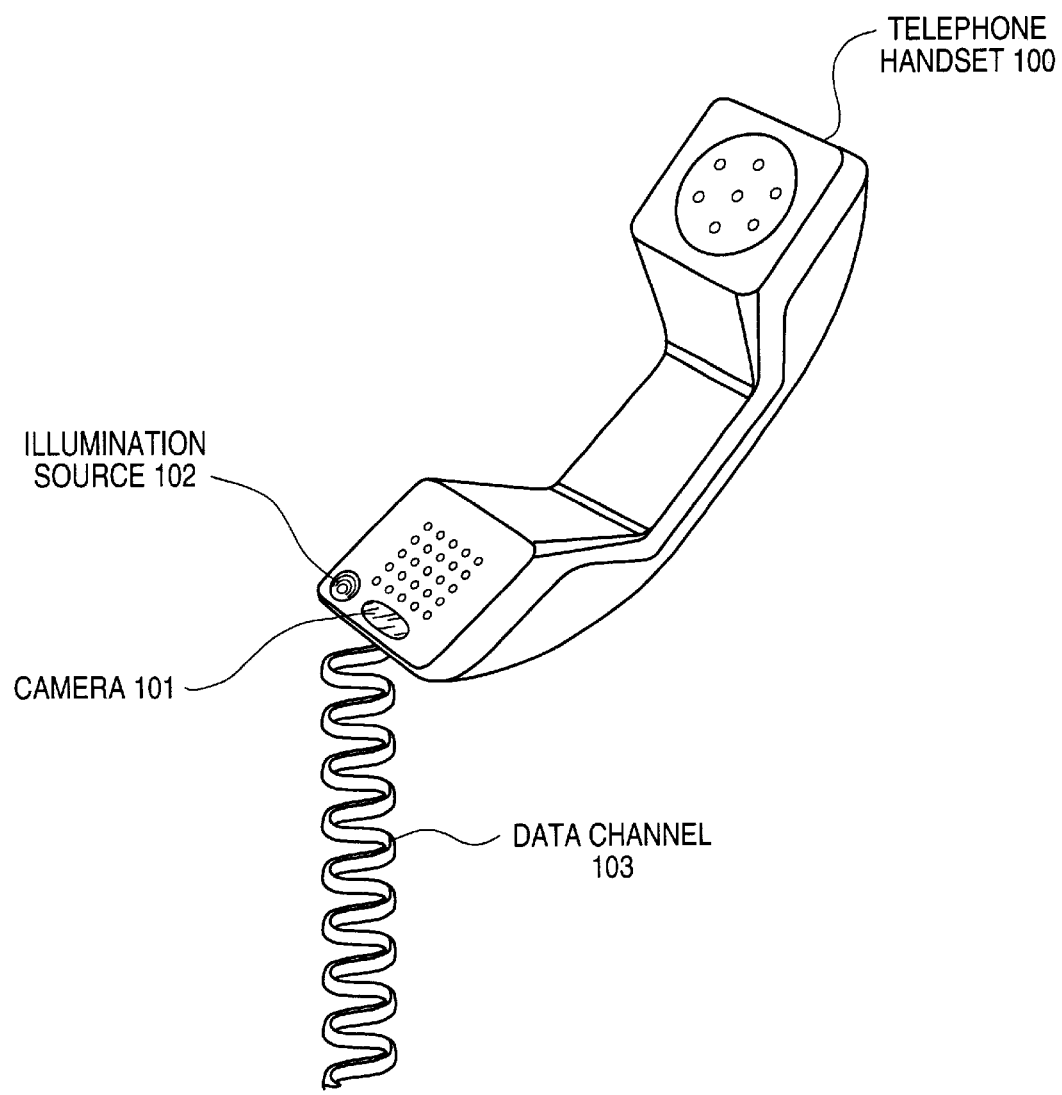
FIG_1

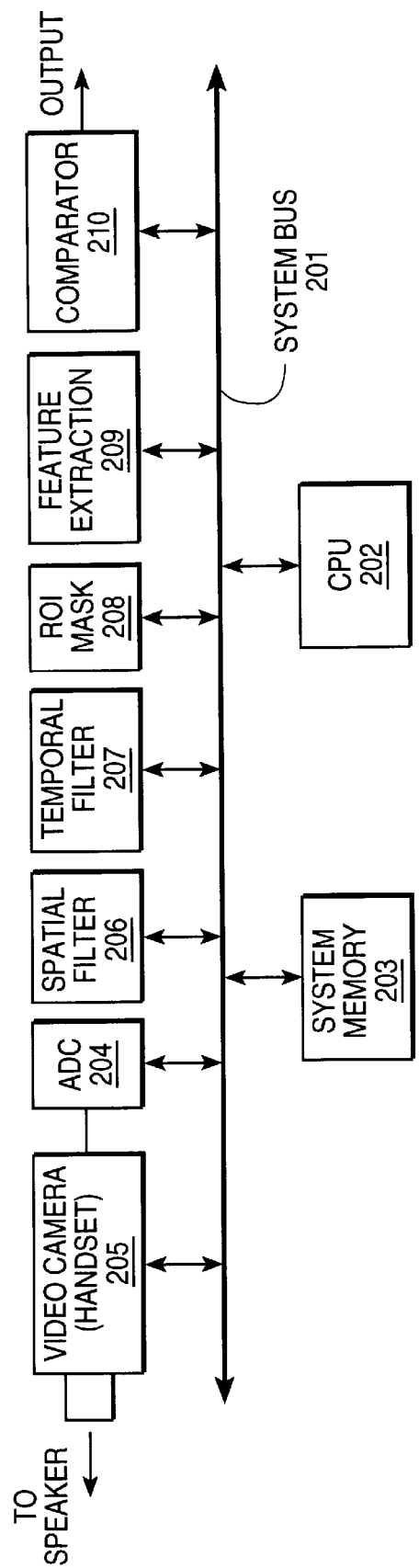
FIG_2

SPEECHREADING USING FACIAL FEATURE PARAMETERS FROM A NON-DIRECT FRONTAL VIEW OF THE SPEAKER

FIELD OF THE INVENTION

The present invention relates to the field of speech recognition; particularly, the present invention relates to facial feature extraction for video speech recognition, for use alone or in conjunction with acoustic data recognition.

BACKGROUND OF THE INVENTION

The goal of automatic or machine speech recognition is to design a system that approaches the human ability to understand spoken language amidst variations in speaker accents, gender, speech rate, degree of coarticulation, all in the presence of acoustic distractions and noise. Current automated systems are of lower accuracy and robustness than that which is necessary to fulfill the vast need in such applications as computer speech-to-text conversion, automatic translation and speech based control systems. Representative approaches include hidden Markov models in which transition probabilities are encoded in links between nodes (states) representing phonemic segments, neural network methods and "blackboard" methods in which multiple special purpose phonological, lexical and grammatical based subsystems are combined to work synergistically to maximize speech recognition score.

Any predictive source of information and any constraints that could be reasonably incorporated into an artificial system would tend to increase the recognition accuracy and thus be desirable to include in a speech recognition system. Traditionally, most research has focused on the inclusion of high level linguistic information such as grammatical and syntactical data. It is clear that humans can employ information other than the acoustic signal in order to enhance understanding. For example, hearing impaired humans often utilize visual information for "speech reading" in order to improve recognition accuracy. See, for example, Dodd, B. and Campbell, R. (eds.), "Hearing by Eye: The Psychology of Lipreading," Hillsdale, N. J., Lawrence Erlbaum Press (1987); or DeFilippo, C. L. and Sims, D. G. (eds.), "New Reflections on Speechreading," special issue of The Volta Review 90(5), (1988).

Speechreading can provide direct information about speech segments and phonemes, as well as about rate, speaker gender, and identity, and subtle information for separating speech from background noise. The well-known "cocktail party effect," in which speech corrupted by crowd noise is made significantly more intelligible when the talker's face can be seen, provides strong evidence that humans use visual information in speech recognition.

Several speechreading systems have been described recently including: (a) Petajan, E. D., et al., "An Improved Automatic Lipreading System to Enhance Speech Recognition," ACM SIGCHI-88, 19–25 (1988); (b) Pentland, A., et al., "Lip Reading: Automatic Visual Recognition of Spoken Words," Proc. Image Understanding and Machine Vision, Optical Society of America, Jun. 12–14 (1984); and (c) Yuhas, B. P., et al., "Integration of Acoustic and Visual Speech Signals Using Neural Networks," November 1989, IEEE Communications Magazine (1989). Petajan, et al. describes using thresholded images (pixels) of a talker's face during the production of a word together with a dictionary of pre-stored labeled utterances and a standard distance classifier for visual recognition. Pentland, et al. describes using an optical flow technique to estimate the velocities of the upper lip, lower lip, and the two corners of the mouth from the raw pixel video image of the mouth. They then used a principle components analysis and a minimum distance classifier on three and four digit phrases. Yuhas, et al. discusses training a neural network using static images of the mouth shape for vowel recognition together with a controller with free parameters for adjusting the relative weights of visual and auditory contributions for best recognition in the presence of different levels of acoustic noise.

Other exemplary speechreading systems are described in U.S. Pat. No. 4,975,960, entitled "Electronic Facial Tracking and Detection System and Method and Apparatus for Automated Speech Recognition" (Pentajen), issued Dec. 4, 1990; D. Stork, V. Prasad, G. Wolff, "Human and Machine Learning of Speechreading", submitted to the Computational Learning and Neural Learning Workshop, Provincetown, Mass., September, 1993; Stork, Wolff and Levine, "Neural Network Lipreading System for Improved Speech Recognition", IJCNN Int'l Joint Conf. on Neural Networks, IEEE (New York, N.Y.), 1992, pgs. 289–95 vol. 2; and P. Silsbee & A. Borik, "Automatic Lipreading", 30th Int'l Biomedical Sciences Instrumentation Symposium, vol. 29, pgs. 415–422 (1993).

One of the largest market share for applications of automatic speech recognition involve telephone systems. For instance, one application involves automatic routing of calls based on a caller's verbal input. Another application is the automatic transcription of phone orders in, for instance, a stock/commodities trading house. In any automatic transcription application, it is most important that the information of an individual speaking be accurately and reliably transcribed, despite distracting background noise. The value of these systems to the trading house, and the technical difficulty of their solution is reflected in the price, which is approximately $10,000–$20,000 per system.

Although these systems are successful, they are problematic in that they generally have use of only a small vocabulary and only a small number of talkers are capable of using them. It is desirable to provide systems that are capable of accommodating larger vocabularies and are adaptable to a larger number of users, while still providing a level of accuracy necessary for their application.

SUMMARY OF THE INVENTION

A system for performing recognition is described. The system of the present invention comprises a telephone transmitter, a camera, a data channel and recognition processing logic. The telephone transmitter is contained in a telephone housing and transmits sound information. The camera is directly mounted to and positioned with respect to the telephone housing to obtain video information from a non-direct fronted view of the speaker corresponding to at least one facial feature for speechreading. The data channel is coupled to the camera to transfer the video information from the camera. The recognition processing logic is coupled to the data channel to perform speechreading recognition of the video information.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a block diagram of the handheld telephone of the present invention.

FIG. 2 illustrates an exemplary recognition system.

DETAILED DESCRIPTION OF THE PRESENT INVENTION

An apparatus for obtaining facial features for use in speechreading is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

FIG. 1 illustrates one embodiment of the telephone handset of the present invention. Referring to FIG. 1, the telephone handset 100 is shown having a camera 101 and an illumination source 102. Camera 101 and illumination source 102 are mounted to the transmitter portion of telephone handset 100. The illumination source 102 illuminates the mouth region of a user (speaker not shown) while the user is speaking on the telephone. The illuminated area is imaged by camera 101. The video data received by camera 101 is forwarded to a recognition processing system via data channel 103 to undergo recognition.

In one embodiment, telephone handset 100 comprises a standard telephone handset. The present invention may be integrated into a telephone headset, as opposed to a handset.

Camera 101 is mounted directly to handset 100 to provide image data that undergoes facial feature extraction to obtain information that may be used in recognition. In one embodiment, camera 101 comprises a miniature digital camera, such as the camera manufactured and sold by the corporate assigne of the present invention. In one embodiment, camera 101 is an infrared (IR)-sensitive or optical (or "IR and optical" sensitive) camera.

Illumination source 102 illuminates a speaker's mouth area using a light source. In one embodiment, illumination source 102 comprises an infrared (IR) source. Note that an illumination source may not be necessary where existing lighting (e.g., the ordinary ambient light) is enough to illuminate a speaker's mouth.

In one embodiment, data channel 103 comprises a high-bandwidth (e.g., video) data channel that transfers video information to a local site for processing and classification. In one embodiment, data channel 103 also transfers audio data received by the transmitter portion of the telephone handset 100 to a communications network or to a system to undergo recognition itself.

The video (and audio) data transferred by data channel 103 is subjected to at least one recognition algorithm in the present invention. In one embodiment, recognition is performed on both the audio and video data received by telephone handset 100, the result of which is generally more accurate.

In the present invention, the positioning of camera 101 is very important. In one embodiment, camera 101 has a range of approximately 0.5 to 5 cm. In order to obtain the necessary facial features used for speechreading, camera 101 is positioned with respect to telephone handset 100 such that the image data obtained is not a direct frontal view. That is, camera 101 images a portion of the speaker's mouth from a location which is at an angle with respect to the direct frontal view of the speaker. In one embodiment, the placement of camera 101 is at an angle with respect to the direct frontal view to enable obtaining the position of the tongue (for /la/, /ta/, etc.) and the rounding protrusion of the lips (for /oo/). The specific angle is dependent on an individual user's facial features and their positioning of the handset 100. Accordingly, these features are better detected and more easily extracted than the prior art, and thus, capable of use in recognition to improve accuracy over that of the prior art. Conversely, the position of the jaw is very difficult to detect directly from the image, but can be reliably inferred from the teeth separation. The position of camera 101 in the present invention allows for imaging the teeth separation of the speaker as well. Thus, the present invention performs speechreading using the position of the tongue, rounding protrusion of the lips and separation of the teeth. Note that the present invention is not limited to using only these three facial features and other facial features may be used. However, the possible facial features that may be used are limited by the position and location of camera 101 with respect to the speaker's mouth.

OVERVIEW OF THE SYSTEM OF THE PRESENT INVENTION

The input data from camera 101 is sent via data channel 104 to a recognition processing subsystem that performs speechreading recognition. In one embodiment, the recognition processing subsystem performs pattern matching using any of a number of well-known pattern matching techniques. For instance, the recognition processing subsystem may perform Dynamic Time Warping (DTW) pattern recognition, Hidden Markov Model (HMM) pattern recognition, Time Delay Neural Network (TDNN) pattern matching, or any other recognition processing technique.

In one embodiment, the recognition processing subsystem also performs audio recognition in cooperation with speechreading recognition. In this manner, the speechreading recognition acts to enhance the accuracy of the audio recognition.

FIG. 2 is a block diagram illustrating an exemplary speechreading recognition system using the input device of FIG. 1. The recognition system is organized around a system bus 201, central processing unit (CPU 202) and system memory 203. The mouth of the speaker to be recognized may be illuminated by illumination source 102 (FIG. 1) or by ordinary ambient light such as normally found in an office environment. The image is recorded by video camera 205, such as camera 101 of FIG. 1, which may be any standard digital camera and the output raster scanned image is fed to analog-to-digital converter (ADC) 204 that produces a sampled and quantized raster image (frame) that is stored in system memory 203. A sequence of raster scanned image frames are processed by video camera 205 and ADC 204 representing one or more utterances by the speaker.

In one embodiment, video camera 205 generates 30 frames per second. Each frame, when converted by ADC 204, becomes an array of 640×480 pixels, each pixel being an 8-bit number representing the image intensity (luminance or gray scale) at each of the points sampled by ADC 204. Because of the high degree of redundancy in the two interlaced fields of each frame from video camera 205, alternate fields may be discarded.

The pixel frames stored in system memory 203 are pre-processed by spatial filter 206 and temporal filter 207. Spatial filter 206 performs a smoothing or low pass filtering operation for the reduction of spatial noise and an edge enhancement operation for sharpening image edges. The spatially filtered images are also smoothed across three sequential frames, i.e., temporal smoothing using a low pass filter of temporal filter 207. Either filtering operation may be performed first or the combined smoothing and edge sharpening may be performed as a single filtering operation. Spatial and temporal filtering are well-known in the art. These are the filtered images stored in system memory 203.

Once the filtered images are obtained, it may be desirable to reduce the size of image being used in future processing, i.e., retain only the region of interest (ROI) that contains the spoken utterance information. The ROI is centered about the mouth opening.

Because the face, other than in the mouth region, tends to be stationary (fixed) relative to the mouth movement between frames, the difference between consecutive frames will be greatest in the mouth region (ROI). In one embodiment, the bright pixels represent the points of greatest change between succeeding frames, i.e., most likely those pixels associated with the mouth.

In one embodiment, the ROI is defined by a mask function that is applied to the image data. The mask may be created by gray-scale thresholding. Using the mask, a spatial area is identified from where the facial features are taken. In one embodiment, this region comprises a rectangular region or a centroid region defined by three spatiotemporal coordinates. Note that for each frame only the two spatial coordinates may be used. The region of the corresponding stored image is cropped so that only the image pixels that are contained within the area defined by the ROI are stored.

The collected ensemble of ROIs associated with a given utterance is then sliced to form a gray-scale image along the y-dimension as a function of the time index, n. It is this information that is used to form a set of cues that may be used for facial feature extraction. The extraction of previously identified facial features is performed by feature extraction unit 17.

Once the facial features have been extracted, pattern recognition is performed, typically by the central processing unit running software. In the case of DTW, several reference patterns that are known are placed into a reference library. During the DTW procedure, an unknown (video input) pattern is compared against reference patterns of the library in order to locate a match between the unknown and the reference patterns. Each point of the unknown is compared against each point of each reference pattern, and a cost function is generated across a lattice or array of points that runs from left to right across the lattice. The cost is the distance between the unknown pattern and the reference pattern. The goal of the DTW procedure is to locate the lowest cost path across the lattice for each reference pattern and compare the paths of each of the reference patterns in order to locate the best matched pattern to the unknown. The best matched pattern is output from the system as the result of the speechreading recognition.

Thus, the present invention uses a camera directly mounted to a telephone handset (or headset) to obtain selected facial features for use in speechreading recognition.

Note that the speechreading recognition may be performed in conjunction with audio or sound recognition for use in, for instance, a transcription system. In such a case, the audio data also undergoes recognition in a manner similar to described above, except that audio data is received and filtered, as opposed to video data. Both the video and audio data may be time stamped for later correlation of recognition results. In such a case, the results of the recognition are that reference pattern having both data of facial features and audio features that best matches the obtained video and audio data.

The present invention may be advantageously employed in applications where the goal is to transcribe speech from a single speaker (rather than a dialog). Examples of such applications include financial transactions such a stock trading and automatic recording of phone orders, for instance, placed by the purchasing department of a large corporation, the military, etc.

One benefit of the present invention is that it provides for reliable training. Because a single telephone is typically used by the same speaker repeatedly, the training of the speechreading recognition system should be reliable. Furthermore, another benefit of the present invention is that the recognition algorithms should be able to better track long-term variations in the speaker's speech.

Another benefit of the present invention is that the components necessary to perform the imaging of the facial features and their subsequent recognition are all commonly available, including the speechreading subsystem, digital cameras, and high-bandwidth communications and protocols.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, an apparatus and system for obtaining facial features for use in speechreading has been described.

I claim:

1. A system for performing recognition comprising:
   a telephone transmitter contained in a movable telephone transmitter housing;
   a camera directly mounted to and positioned with respect to the telephone transmitter to obtain video information, corresponding to at least one facial feature for speechreading, from a non-direct frontal view of a speaker;
   a data channel coupled to the camera to transfer the video information from the camera; and
   a recognition processing logic coupled to the data channel to perform speechreading recognition of the video information.

2. The system defined in claim 1 wherein the telephone transmitter housing comprises a telephone handset.

3. The system defined in claim 1 wherein the telephone transmitter housing comprises a telephone headset.

4. The system defined in claim 1 wherein the camera comprises a digital camera.

5. The system defined in claim 1 wherein the video information comprises position of a tongue of a user and the rounding protrusion of the lips.

6. The system defined in claim 5 wherein the video information further comprises the position of the jaw.

7. The system defined in claim 6 wherein the position of the jaw is based on separation of teeth.

8. The system defined in claim 1 further comprising a light source mounted on the telephone device to illuminate a user's mouth.

9. The system defined in claim 1 further comprising an infrared (IR) source mounted to the telephone device to illuminate a user's mouth.

10. The system defined in claim 9 wherein the camera comprises an IR-sensitive camera.

11. The system defined in claim 9 wherein the camera comprises an optical camera.

12. An apparatus for obtaining data for use by recognition processing logic, said apparatus comprising:

a telephone transmitter;

a camera coupled to the telephone transmitter and positioned with respect to the telephone transmitter to obtain video information, corresponding to at least one facial feature for speechreading, from a non-direct frontal view of a speaker, wherein the video information comprises position of a tongue of a user and the rounding protrusion of the lips;

a data channel coupled to the camera to transfer the video information from the camera to the recognition processing logic to enable speechreading recognition of the video information.

13. The apparatus defined in claim 12 wherein the video information further comprises the position of the jaw.

14. The apparatus defined in claim 13 wherein the position of the jaw is based on separation of teeth.

15. The apparatus defined in claim 12 wherein the camera comprises a digital camera.

16. The apparatus defined in claim 12 further comprising a light source mounted to the telephone device to illuminate a user's mouth.

17. The apparatus defined in claim 12 further comprising an infrared (IR) source mounted to the telephone device to illuminate a user's mouth.

18. The apparatus defined in claim 17 wherein the camera comprises an IR-sensitive camera.

19. The apparatus defined in claim 17 wherein the camera comprises an IR optical-sensitive camera.

20. A method for performing recognition comprising the steps of:

receiving audio information from a speaker using a telephone transmitter;

receiving video information, corresponding to at least one facial feature of the speaker, from a non-direct frontal view of the speaker, using a camera coupled to the telephone transmitter;

transferring the audio and video information by a data channel to recognition logic for speech and pattern recognition.

21. The system defined in claim 1 wherein the camera images a portion of the speaker's mouth from a location which is at an angle with respect to a direct frontal view of the speaker that is dependent on the speaker's facial features and the speaker's positioning of the telephone transmitter.

22. The apparatus defined in claim 12 wherein the camera images a portion of the speaker's mouth from a location which is at an angle with respect to a direct frontal view of the speaker that is dependent on the speaker's facial features and the speaker's positioning of the telephone transmitter.

* * * * *